United States Patent
Usui (10) Patent No.: US 8,312,221 B2
(45) Date of Patent: Nov. 13, 2012

(54) CACHE SYSTEM, CACHE SYSTEM CONTROL METHOD, AND INFORMATION PROCESSING APPARATUS

(75) Inventor: Hiroyuki Usui, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 542 days.

(21) Appl. No.: 12/469,276

(22) Filed: May 20, 2009

(65) Prior Publication Data

US 2010/0030971 A1 Feb. 4, 2010

(30) Foreign Application Priority Data

Jul. 29, 2008 (JP) ................................. 2008-194676

(51) Int. Cl.
*G06F 12/08* (2006.01)
(52) U.S. Cl. ....................... 711/129; 711/144
(58) Field of Classification Search ................ 711/129, 711/144
See application file for complete search history.

(56) References Cited

U.S. PATENT DOCUMENTS

| | | | | |
|---|---|---|---|---|
| 5,809,560 | A * | 9/1998 | Schneider | 711/204 |
| 2005/0114605 | A1 * | 5/2005 | Iyer | 711/133 |
| 2005/0210202 | A1 * | 9/2005 | Choubal et al. | 711/138 |
| 2006/0242644 | A1 * | 10/2006 | Blue | 718/100 |
| 2008/0256303 | A1 * | 10/2008 | Croxford et al. | 711/144 |
| 2008/0263339 | A1 * | 10/2008 | Kriegel et al. | 712/228 |

FOREIGN PATENT DOCUMENTS

| | | |
|---|---|---|
| JP | 2002-163150 | 6/2002 |
| JP | 2004-139349 | 5/2004 |
| JP | 2005-293300 | 10/2005 |
| JP | 2005-316842 | 11/2005 |

OTHER PUBLICATIONS

U.S. Appl. No. 12/432,883, filed Apr. 30, 2009, Hiroyuki Usui.
Office Action issued Sep. 4, 2012, in Japanese Patent Application No. 2008-194676, (with English-language Translation).

* cited by examiner

*Primary Examiner* — Michael Tran
(74) *Attorney, Agent, or Firm* — Oblon, Spivak, McClelland, Maier & Neustadt, L.L.P.

(57) ABSTRACT

To provide a cache system that can dynamically change a cache capacity by memory areas divided into plural. The cache system includes a line counter that counts the number of effective lines for each memory area. The effective line is a cache line in which effective cache data is stored. Cache data to be invalidated at the time of changing the cache capacity is selected based on the number of effective lines counted by the line counter.

20 Claims, 5 Drawing Sheets

| ADDRESS [16:15] | OUTPUT |
|---|---|
| 00 | R1 |
| 01 | R2 |
| 10 | R3 |
| 11 | R4 |

FIG.9

CACHE SYSTEM, CACHE SYSTEM CONTROL METHOD, AND INFORMATION PROCESSING APPARATUS

CROSS-REFERENCE TO RELATED APPLICATIONS

This application is based upon and claims the benefit of priority from the prior Japanese Patent Application No. 2008-194676, filed on Jul. 29, 2008; the entire contents of which are incorporated herein by reference.

BACKGROUND OF THE INVENTION

1. Field of the Invention

The present invention relates to a cache system, a cache system control method, and an information processing apparatus.

2. Description of the Related Art

Conventionally, a microprocessor generally carries a cache memory on a chip to solve a bottleneck in memory access. To improve processing performance, the capacity of the cache memory carried on the chip is increasing year after year. While chips with low power consumption are becoming predominant, the proportion of power consumption of the cache memory in power consumption of the microprocessor is increasing. Accordingly, reduction of power consumption in the cache memory has been demanded.

As a method of reducing the power consumption of a cache memory, there is a method in which power consumption at the time of accessing is reduced by dividing a data memory and a tag memory into a plurality of memory areas and accessing only to parts of these memory areas. Recently, because leak power at the time of stopping the access has been regarded as a problem, there is a method in which a set associative system using a plurality of ways is used, a memory area is divided into a plurality of areas, and each of the divided areas is allocated to each way, and power supply to some parts of the memory areas is cut off (for example, see Japanese Patent Application Laid-open No. 2005-316842). By controlling the access to each way, the cache capacity is changed by the memory areas allocated to the ways.

When an access to a certain way is newly prohibited, cache data stored in the way is invalidated. Therefore, write-back of data to a lower-order memory in a lower hierarchy is required. Further, when the cache capacity is decreased, the number of ways is also decreased. Therefore, the frequency of cache misses increases, thereby degrading the performance of the cache. Further, the cache capacity may not be changed to a pattern having a capacity more than the number of ways.

To change the cache capacity, a method of changing the number of indexes can be also employed. An increase of the cache misses is suppressed by maintaining the number of ways. When the cache capacity is to be increased, there is data having an arrangement change by increasing the number of indexes. In the case of changing the number of indexes, write-back of data to the lower-order memory is required not only at the time of decreasing the cache capacity but also at the time of increasing the cache capacity, different from the case of changing the number of ways. Accordingly, there is another problem that the time required for changing the cache capacity increases.

BRIEF SUMMARY OF THE INVENTION

A cache system according to an embodiment of the present invention comprises: a line counter that counts number of effective lines for each of the memory areas in which cache data is arranged when a cache capacity is maximum, wherein the effective line is a cache line in which effective cache data is stored, and the cache data to be invalidated at a time of changing the cache capacity is selected based on the number of the effective lines counted by the line counter.

A cache system control method according to an embodiment of the present invention comprises: dynamically changing a cache capacity by memory areas divided into plural; and counting number of effective lines for each memory area in which cache data is arranged when the cache capacity is maximum, wherein the effective line is a cache line in which effective cache data is stored; and selecting cache data to be invalidated at a time of changing the cache capacity based on a counted number of the effective lines.

An information processing apparatus according to an embodiment of the present invention comprises: a cache system that can dynamically change a cache capacity by memory areas divided into plural; and a master that accesses the cache system, wherein the cache system includes a line counter that counts number of effective lines for each memory area in which cache data is arranged when the cache capacity is maximum, the effective line is a cache line in which effective cache data is stored, and cache data to be invalidated at a time of changing the cache capacity is selected based on the number of the effective lines counted by the line counter.

DETAILED DESCRIPTION OF THE INVENTION

Exemplary embodiments of a cache system, a cache system control method, and an information processing apparatus according to the present invention will be explained below in detail with reference to the accompanying drawings.

Figure 1:
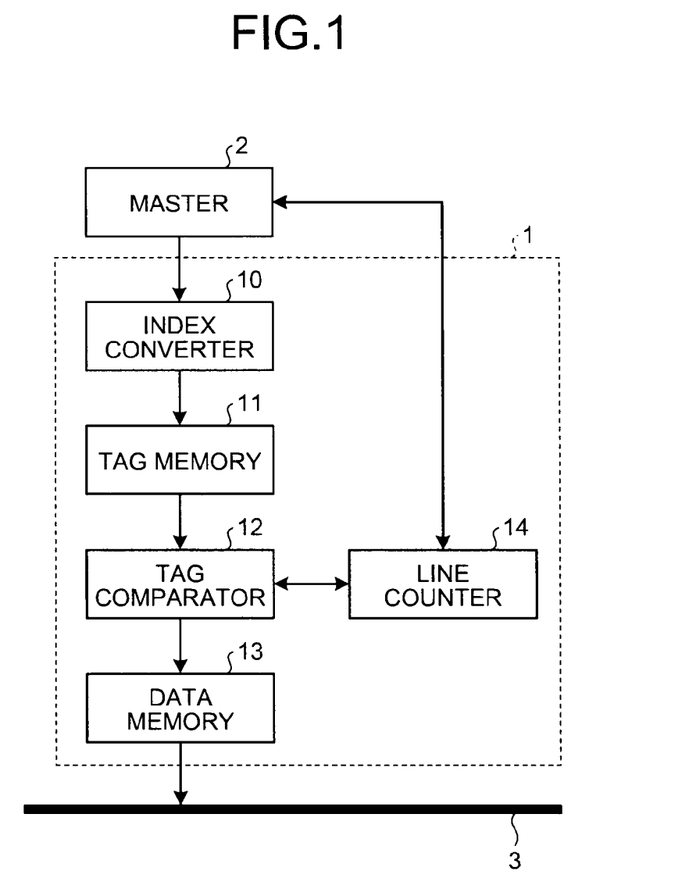
FIG. 1 is a block diagram of a schematic configuration of an information processing apparatus having a cache system according to a first embodiment of the present invention.

FIG. 1 is a block diagram of a schematic configuration of an information processing apparatus having a cache system 1 according to a first embodiment of the present invention. The information processing apparatus includes the cache system 1, a master 2, a bus 3, and a main memory. The cache system 1 includes a data cache memory, and adopts, for example, a 4-way set associative system. The master 2 can be a processor or a hard engine that accesses the cache system 1. The cache system 1 is connected to the main memory via the bus 3.

The cache system 1 can be incorporated in the chip or externally attached thereto, and can be used for any hierarchy of, for example, L1 cache (Level 1 Cache), L2 cache (Level 2 Cache), and L3 cache (Level 3 Cache). Further, the cache system 1 can be appropriately transformed based on the outline explained below, by persons skilled in the corresponding technique. For example, the cache system 1 can be also transformed to any system adopting associativity of an n-way set associative system other than the 4-way set associative system, a full associative system, and a direct map system. Therefore, the following explanations should be understood broadly as contents disclosed with respect to the corresponding technical field, and the present invention is not limited to the explanations.

The cache system 1 includes an index converter 10, a tag memory 11, a tag comparator 12, a data memory 13, and a line counter 14. The tag memory 11 stores tag information corresponding to a cache line. The tag comparator 12 functions as a tag comparing unit that compares tag information at an address, with which the cache system 1 is cache accessed, with the tag information read from the tag memory 11. The data memory 13 stores cache data. The index converter 10 and the line counter 14 will be described later.

When the master 2 performs read access for reading data, tag information of each way is read from the tag memory 11 for an accessed index. The tag comparator 12 compares the tag information read from the tag memory 11 with the tag information at the accessed address. When any tag information read from the tag memory 11 matches the tag information at the accessed address by comparison by the tag comparator 12, hit cache data is selected and output from the data memory 13. When any tag information read from the tag memory 11 does not match the tag information at the accessed address, data is refilled to the cache line from a lower-order memory. The lower-order memory is a memory in a lower hierarchy with respect to the cache system 1, which is, for example, the L2 cache or L3 cache with respect to the L1 cache, or a memory externally attached to the chip with respect to the cache incorporated in the chip.

When the master 2 performs write access for writing data, tag information of each way is read from the tag memory 11 for the accessed index. The tag comparator 12 compares the tag information read from the tag memory 11 with the tag information at the accessed address. When any tag information read from the tag memory 11 matches the tag information at the accessed address by comparison by the tag comparator 12, hit cache data in the data memory 13 is updated. When any tag information read from the tag memory 11 does not match the tag information at the accessed address, a line having a cache miss is refilled and data is allocated onto the cache (write allocation system). Alternatively, the line having a cache miss is not refilled, and data is written in the lower-order memory (non-write allocation system). The cache system 1 according to the first embodiment adopts a write-back system in which only cache data is updated with respect to a write access and write to the main memory is collectively performed.

In the cache system 1, a line size of the cache line is 256 bytes and the maximum cache capacity is 512 kilobytes (Kbytes), and an increase or decrease of the cache capacity to three patterns of 128 Kbytes, 256 Kbytes, and 512 Kbytes is possible.

Figure 2:
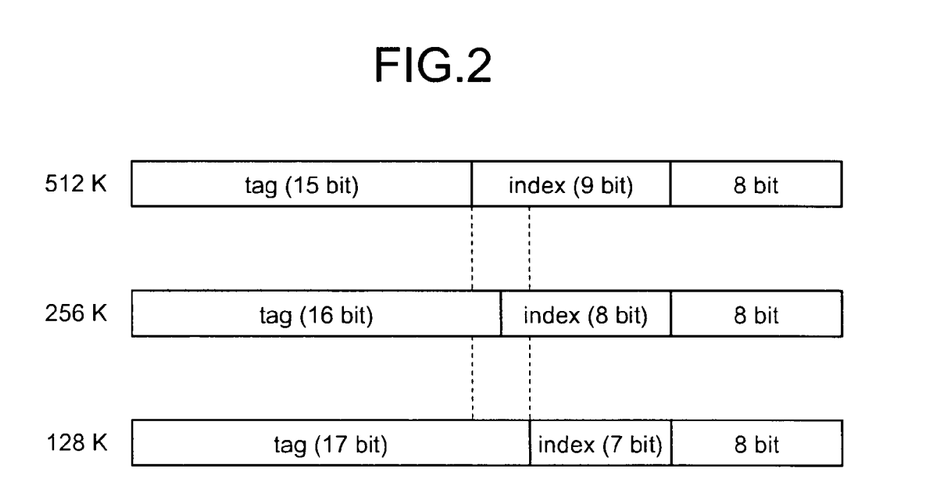
FIG. 2 is a schematic diagram for explaining positions of tag information and an index number at a cache accessed address, and a change of a cache capacity.

FIG. 2 is a schematic diagram for explaining positions of the tag information and the index number at a cache accessed address, and a change of the cache capacity. It is assumed here that cache access is performed by a 32-bit signal. In any case of the memory capacity being 512 Kbytes, 256 Kbytes, or 128 Kbytes, the last 8 bits of 32 bits are used for application other than the address. In the case of 512 Kbytes, 9 bits in front of the last 8 bits are used for the index number, and 15 bits in front of the index number are used as the tag information. In the case of 256 Kbytes, 8 bits in front of the last 8 bits are used for the index number, and 16 bits in front of the index number are used as the tag information. In the case of 128 Kbytes, 7 bits in front of the last 8 bits are used for the index number, and 17 bits in front of the index number are used as the tag information.

Figure 3:
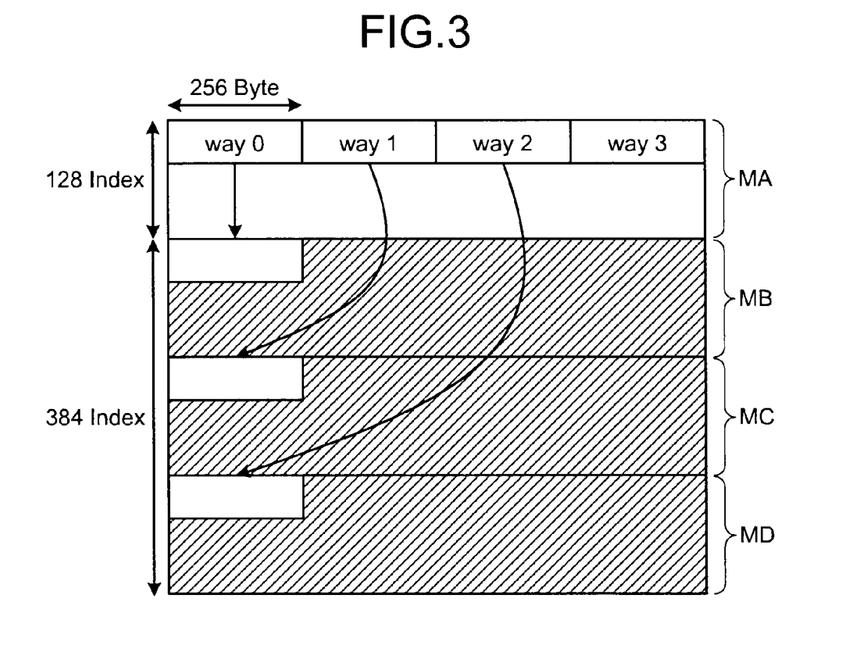
FIG. 3 is a schematic diagram for explaining an increase of a cache capacity by the cache system.

FIG. 3 is a schematic diagram for explaining an increase of the cache capacity by the cache system 1. The cache system 1 can dynamically change the cache capacity in a unit of 128-Kbyte memory areas MA, MB, MC, and MD obtained by dividing the memory area at the time of having the maximum capacity into four. The respective memory areas MA, MB, MC, and MD respectively correspond to 128 indexes.

For example, when the cache capacity is to be changed from 128 Kbytes to 512 Kbytes without changing the number of ways, the number of indexes changes from 128 to 512. Lower-order 2 bits of the tag information when the cache capacity is 128 Kbytes are changed to higher-order 2 bits of the index number by changing the cache capacity to 512 Kbytes (see FIG. 2). In cache data in which the higher-order 2 bits of the index number are changed, arrangement is changed before and after the cache capacity is increased.

By changing the cache capacity, for example as shown in FIG. 3, cache data of way 0 of the cache data stored in index 0 can move to index 128, cache data of way 1 to index 256, and cache data of way 2 to index 384, respectively. The cache data with the arrangement being changed cannot be accessed. Therefore, with a change of the cache capacity, processing to write back the effective cache data to the lower-order memory and invalidate the cache data is required. When the cache capacity is changed from 128 Kbytes to 256 Kbytes, and from 256 Kbytes to 512 Kbytes, write back and invalidation of the cache data are required as well.

Figure 4:
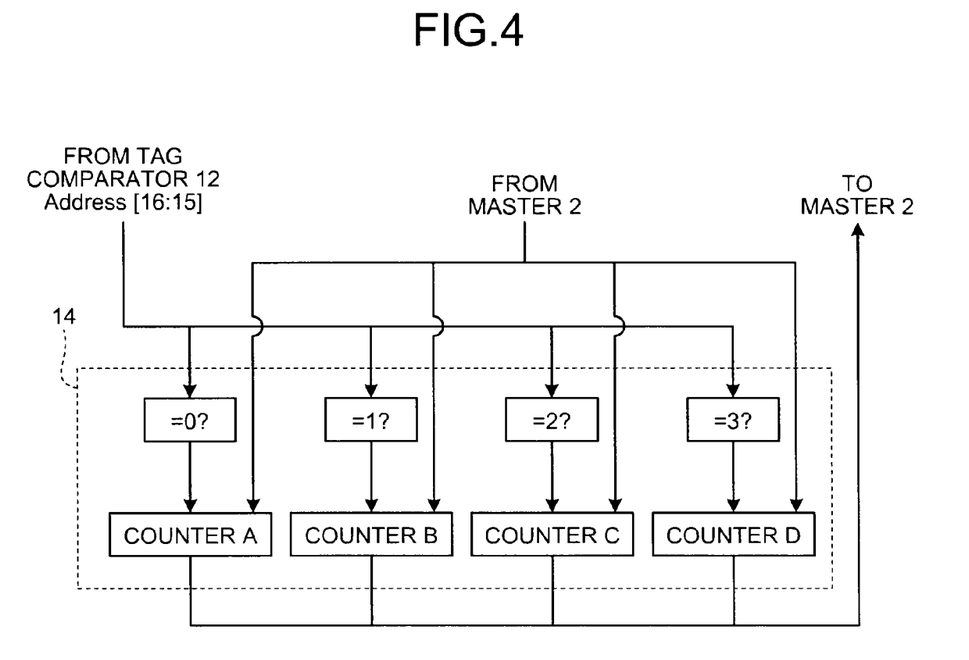
FIG. 4 depicts a detailed configuration of a line counter.

FIG. 4 depicts a detailed configuration of the line counter 14 shown in FIG. 1. The line counter 14 has four counters (a counter A, a counter B, a counter C, and a counter D), and a comparator provided for each counter. When there is a write access or write back by the master 2, the tag comparator 12 outputs 2 bits of the fifteenth and sixteenth bits of the accessed address to the line counter 14.

A bit string output from the tag comparator 12 to the line counter 14 includes necessary and sufficient number of bits for indicating the number of counters in the line counter 14, from the higher-order bits of the bit string expressing the index number when the cache capacity is maximum. In the first embodiment, in the case of 512 Kbytes, which is a maximum capacity, the bit string expressing the index number is from the sixteenth to eighth bits. To indicate the number of counters in the line counter 14, that is, four, two bits are necessary and sufficient. Therefore, input to the line counter 14 will be the two of the fifteenth and sixteenth bits. The bit string output to the line counter 14 expresses the memory area where the data is arranged, when the cache capacity is maximum. The two of the fifteenth and sixteenth bits correspond to the last 2 bits of the tag information, when the cache capacity is 128 Kbytes.

The counter A, the counter B, the counter C, and the counter D respectively increment a counted number by one every time there is a write access, and decrement the counted number by one every time there is a write back. An operation of the counter A is performed under a condition that as a result of comparison between the input bit and "0(=00)" in the comparator corresponding to the counter A, these match each other. An operation of the counter B is performed under a condition that as a result of comparison between the input bit and "1(=01)" in the comparator corresponding to the counter B, these match each other. An operation of the counter C is performed under a condition that as a result of comparison between the input bit and "2(=10)" in the comparator corresponding to the counter C, these match each other. An operation of the counter D is performed under a condition that as a result of comparison between the input bit and "3(=11)" in the comparator corresponding to the counter D, these match each other.

The counted number of the counter A expresses the number of dirty lines, in which the cache data is arranged in memory area MA (indexes 0 to 127) when the cache capacity is maximum 512 Kbytes. The counted number of the counter B expresses the number of dirty lines, in which the cache data is arranged in memory area MB (indexes 128 to 255) when the cache capacity is maximum 512 Kbytes. The counted number of the counter C expresses the number of dirty lines, in which the cache data is arranged in memory area MC (indexes 256 to 383) when the cache capacity is maximum 512 Kbytes. The counted number of the counter D expresses the number of dirty lines, in which the cache data is arranged in memory area MD (indexes 384 to 511) when the cache capacity is maximum 512 Kbytes.

The dirty line is an effective line in a so-called dirty state in which cache data that does not match data stored in the lower-order memory, for example, the main memory. The line counter 14 counts the number of dirty lines for each of the memory areas MA, MB, MC, and MD, in which the cache data is to be arranged when the cache capacity is maximum 512 Kbytes. The effective line is a cache line where the effective cache data is stored.

Figure 5:
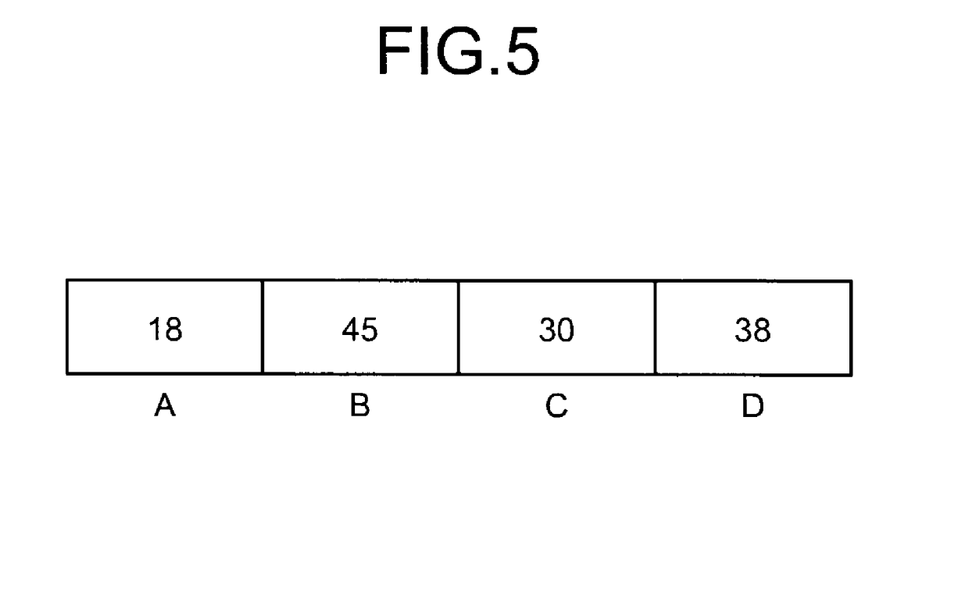
FIG. 5 is an example of counting by the line counter.

By changing the cache capacity from 128 Kbytes to 512 Kbytes, the cache data that is to be arranged in a memory area having a less counted number by the line counter 14 is preferentially invalidated. When the cache capacity is to be increased from 128 Kbytes to 512 Kbytes, for example as shown in FIG. 5, it is assumed that the counted number of the counter A is "18", the counted number of the counter B is "45", the counted number of the counter C is "30", and the counted number of the counter D is "38". In this case, pieces of the cache data to be arranged in the memory areas MA, MC, and MD, to which the counter A, the counter C, and the counter D are respectively allocated, other than the counter B having the largest counted number, are to be invalidated. The master 2 reads the counted number of the line counter 14, and issues an invalidation request to the cache line of the cache data to be arranged in the memory areas MA, MC, and MD.

In response to the invalidation request from the master 2, the tag information in all the cache lines of indexes 0 to 127 before the change of the cache capacity is read from the tag memory 11. The tag comparator 12 compares the tag information read from the tag memory 11 with the tag information of the cache data, which is designated as an invalidation target based on a result of counting by the line counter 14. The cache system 1 writes back the pieces of dirty data, in which the last 2 bits in the tag are "00" corresponding to the counter A, "10" corresponding to the counter C, and "11" corresponding to the counter D, to the main memory to invalidate the cache data.

After an invalidation process, the line counter 14 resets respective counts of the counter A, the counter C, and the counter D to zero. Thus, the cache system 1 selects the invalidation target at the time of changing the cache capacity based on the number of effective lines counted by the line counter 14. Accordingly, an operation requiring the least write back processing can be selected, thereby enabling to reduce the time required for changing the cache capacity.

Figure 6:
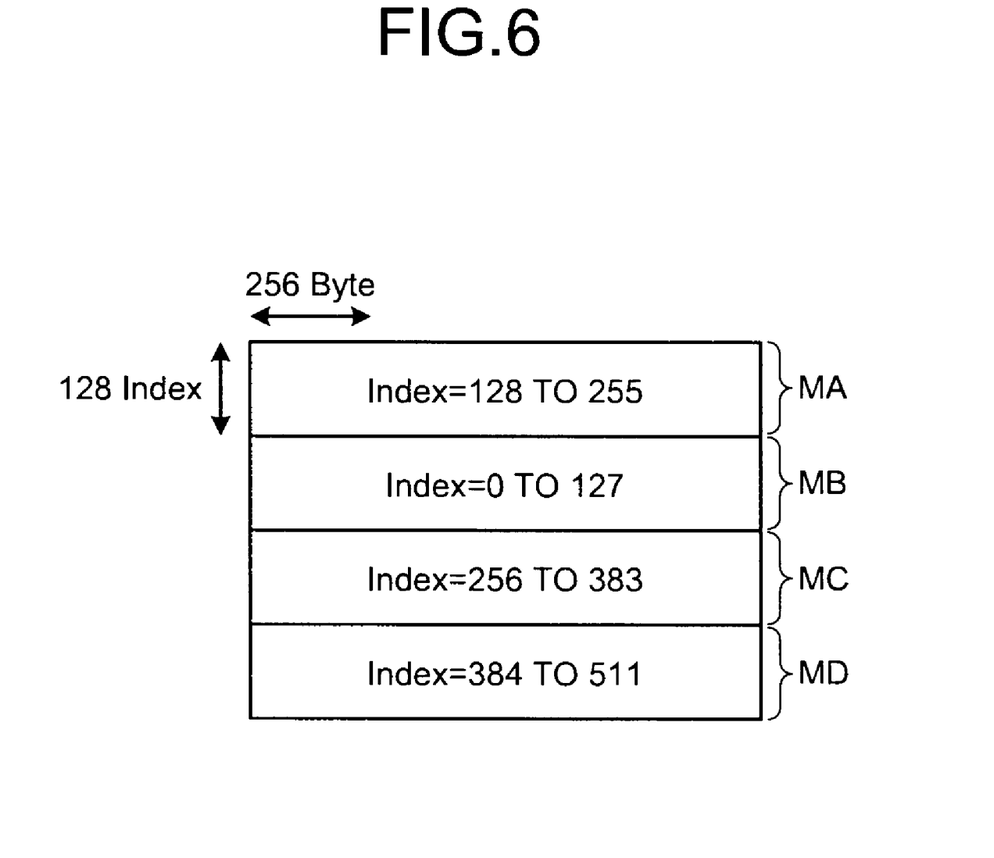
FIG. 6 is a schematic diagram for explaining an arrangement of cache data after the cache capacity has been changed.

FIG. 6 is a schematic diagram for explaining the arrangement of the cache data after the cache capacity has been changed from 128 Kbytes to 512 Kbytes. The cache data allocated with the counter B before the change of the cache capacity, which is to be arranged in memory area MB (hereinafter, "cache data at original indexes 128 to 255"), is moved to memory area MA of 128 Kbytes used before the change of the cache capacity. The cache data allocated with the counter A, which is to be arranged in memory area MA (hereinafter, "cache data at original indexes 0 to 127"), is arranged in memory area MB.

The cache data allocated with the counter C, which is to be arranged in memory area MC (hereinafter, "cache data at original indexes 256 to 383"), is arranged in memory area MC. The cache data allocated with the counter D, which is to be arranged in memory area MD (hereinafter, "cache data at original indexes 384 to 511"), is arranged in memory area MD. Arrangement of cache data in memory areas MB, MC, and MD other than memory area MA in which the cache data is left before and after the change of the cache capacity is arbitrary, and any arrangement other than those explained above can be used.

Figure 7:
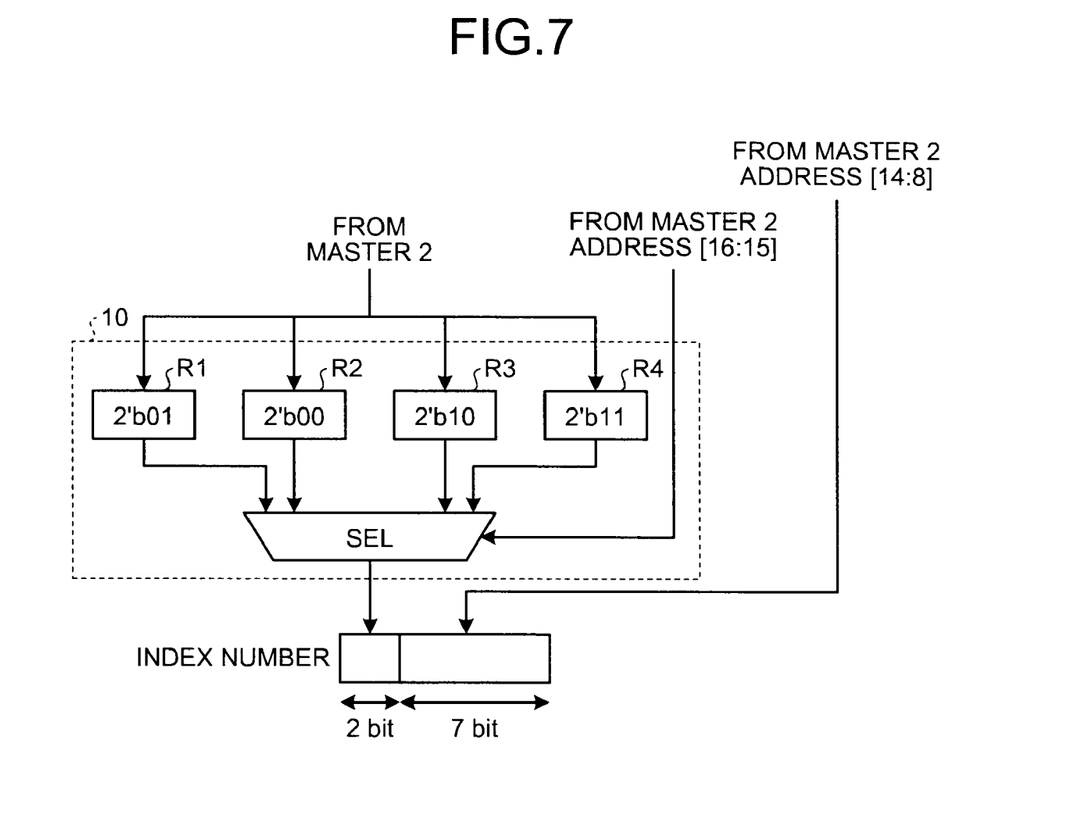
FIG. 7 depicts a detailed configuration of an index converter.

FIG. 7 depicts a detailed configuration of the index converter 10 shown in FIG. 1. The index converter 10 functions as an index converting unit that converts an index of an address, with which the cache system 1 is cache accessed, to match the address with an address of the cache data stored in the cache system 1. The index converter 10 has four registers R1, R2, R3, and R4, and a selector (SEL). The number of registers R1 to R4 is the same as that of the counters provided in the line counter 14 (see FIG. 4).

After the invalidation process has finished, the master 2 sets a 2-bit value to respective registers R1 to R4. The values respectively set to respective registers R1 to R4 express which cache data at the original index before the change of the cache capacity is arranged. "0(=00)" indicates that pieces of cache data at original indexes 0 to 127 are arranged. "1(=01)" indicates that pieces of cache data at original indexes 128 to 255 are arranged. "2(=10)" indicates that pieces of cache data at original indexes 256 to 383 are arranged. "3(=11)" indicates that pieces of cache data at original indexes 384 to 511 are arranged.

Registers R1, R2, R3, and R4 respectively correspond to memory areas MA, MB, MC, and MD. The value "01" of register R1 indicates that the cache data arranged in memory area MA is the cache data at original indexes 128 to 255. Likewise, the value "00" of register R2 indicates that the cache data arranged in memory area MB is the cache data at original indexes 0 to 127, the value "10" of register R3 indicates that the cache data arranged in memory area MC is the cache data at original indexes 256 to 383, and the value "11" of register R4 indicates that the cache data arranged in memory area MD is the cache data at original indexes 384 to 511.

The selector selects and outputs any value stored in registers R1 to R4 according to the 2-bit value of the fifteenth and sixteenth bits of the address accessed from the master 2. The fifteenth and sixteenth two bits of the accessed address correspond to the higher-order 2 bits of the index number, when the cache capacity is 512 Kbytes.

Figure 8:
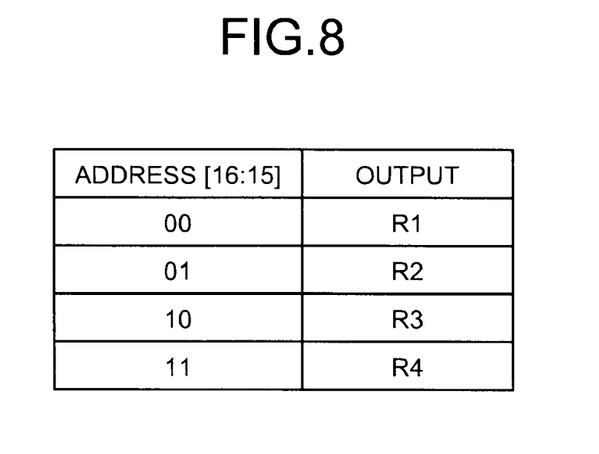
FIG. 8 is a schematic diagram for explaining selection of value by a selector.

FIG. 8 is a schematic diagram for explaining selection of value by the selector. When the fifteenth and sixteenth bits of the accessed address are "00", the selector outputs a value stored in register R1. When the fifteenth and sixteenth bits of the accessed address are "01", the selector outputs a value stored in register R2. When the fifteenth and sixteenth bits of the accessed address are "10", the selector outputs a value stored in register R3. When the fifteenth and sixteenth bits of the accessed address are "11", the selector outputs a value stored in register R4.

The value selected by the selector is the higher-order 2 bits of the converted index number. For the last 7 bits of the converted index number, the bit string of from the fourteenth to eighth bits of the accessed address is directly used.

In the first embodiment, when the fifteenth and sixteenth bits of the accessed address is "01", the selector outputs the value "00" stored in register R2. Because the higher-order 2 bits of the index number are converted from "01" to "00", an access to the cache data at original indexes 128 to 255 becomes possible. When the fifteenth and sixteenth bits of the accessed address is "00", the selector outputs the value "01" stored in register R1. Because the higher-order 2 bits of the index number are converted from "00" to "01", an access to the cache data at original indexes 0 to 127 becomes possible.

When the fifteenth and sixteenth bits of the accessed address is "10", the selector outputs the value "10" stored in register R3. Because the higher-order 2 bits of the index number are left as "10", an access to the cache data at original indexes 256 to 383 becomes possible. When the fifteenth and sixteenth bits of the accessed address is "11", the selector outputs the value "11" stored in register R4. Because the higher-order 2 bits of the index number are left as "11", an access to the cache data at original indexes 384 to 511 becomes possible. The cache system 1 can match the address to be accessed with the cache data stored in the cache system 1 even after the cache capacity is changed, by index conversion by the index converter 10.

The index converter 10 converts the index with respect to all accesses to the cache system 1 not only at the time of read access and write access, but also at the time of an invalidation process associated with a change of the cache capacity. Accordingly, consistency between the address to be accessed and the cache data stored in the cache system 1 can be ensured at all times.

In the first embodiment, the number of counters provided in the line counter 14 matches a number obtained by dividing a maximum value of the cache capacity by a minimum value thereof (maximum value/minimum value) (512/128 Kbytes=4). The number of counters is not limited to the one consistent with the maximum value/minimum value of the cache capacity. The number of counters can be a number larger than the maximum value/minimum value of the cache capacity. The counters only needs to be two or more, and even a number less than the maximum value or the minimum value of the cache capacity can be used.

A second embodiment of the present invention describes a decrease of the cache capacity by the cache system 1 according to the first embodiment. For example, when the cache capacity is changed from 512 Kbytes to 128 Kbytes without changing the number of ways, the number of indexes changes from 512 to 128. When the cache capacity is to be decreased, effective cache data stored in the memory area, to which access is prohibited, is invalidated. Before and after the decrease of the cache capacity, processing to write back the effective cache data to the lower-order memory and invalidate the cache data is required.

For example, when the cache capacity is to be decreased from 512 Kbytes to 128 Kbytes, as shown in FIG. 5, it is assumed that the counted number of the counter A in the line counter 14 is "18", the counted number of the counter B is "45", the counted number of the counter C is "30", and the counted number of the counter D is "38". Also in this case, pieces of the cache data to be arranged in the memory areas MA, MC, and MD to which the counter A, the counter C, and the counter D are respectively allocated, other then the counter B having the largest counted number, are to be invalidated. Also in the second embodiment, an operation requiring the least write back processing can be selected, thereby enabling to reduce the time required for changing the cache capacity.

Figure 9:
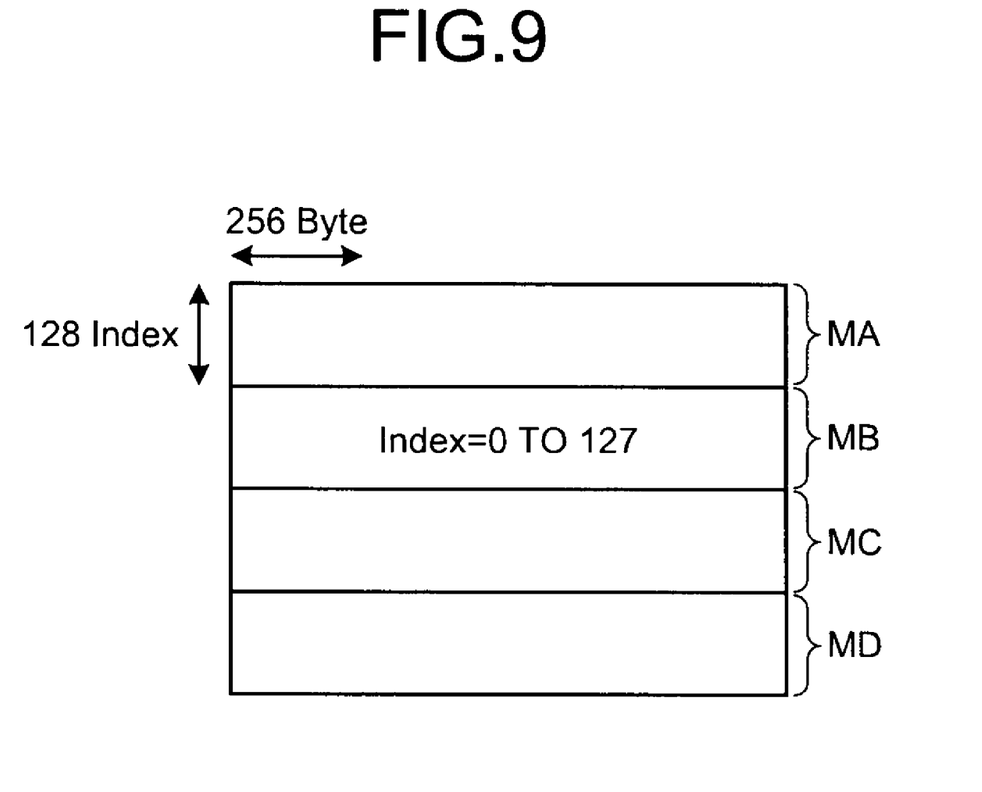
FIG. 9 is a schematic diagram for explaining an arrangement of cache data after the cache capacity has been changed.

FIG. 9 is a schematic diagram for explaining the arrangement of the cache data after the cache capacity has been changed from 512 Kbytes to 128 Kbytes. After the invalidation process, the cache system 1 uses only memory area MB. By decreasing the cache capacity, pieces of effective cache data of the cache data at original indexes 0 to 511 of the cache capacity of 512 Kbytes are arranged to new indexes 0 to 127 of the cache capacity of 128 Kbytes.

In the second embodiment, the master 2 sets "1=(01)" to all registers R1, R2, R3, and R4 of the index converter 10. Accordingly, even when any address is accessed, the selector outputs "01". Also in the second embodiment, the cache system 1 can match the address to be accessed with the cache data stored in the cache system 1 even after the cache capacity is changed, by index conversion by the index converter 10.

A cache system according to a third embodiment of the present invention adopts a write-through system that updates the cache data and data in the main memory simultaneously every time there is a write access. The basic configuration of the cache system according to the third embodiment is the same as that of the cache system 1 according to the first embodiment. A change of the cache capacity according to the third embodiment is explained with reference to the configuration of the cache system 1 according to the first embodiment.

In the third embodiment, the counter A, the counter B, the counter C, and the counter D in the line counter 14 respectively increment the counted number by one every time data is refilled in the cache line from the lower-order memory, and decrement the counted number by one every time the cache data stored in the cache line is released (flushed). As a condition for decrementing the counted number by one, it is not considered whether there is write-back of data from the cache line to the lower-order memory.

The counted number of the counter A expresses the number of effective lines, in which the cache data is arranged in memory area MA (indexes 0 to 127) when the cache capacity is maximum 512 Kbytes. The counted number of the counter B expresses the number of effective lines, in which the cache data is arranged in memory area MB (indexes 128 to 255) when the cache capacity is maximum 512 Kbytes. The counted number of the counter C expresses the number of effective lines, in which the cache data is arranged in memory area MC (indexes 256 to 383) when the cache capacity is maximum 512 Kbytes. The counted number of the counter D expresses the number of effective lines, in which the cache data is arranged in memory area MD (indexes 384 to 511) when the cache capacity is maximum 512 Kbytes.

The line counter 14 counts the number of effective lines for each of memory areas MA, MB, MC, and MD in which the cache data is to be arranged when the cache capacity is maximum 512 Kbytes. Also in the third embodiment, by changing the cache capacity, the cache data that is to be arranged in a memory area having a less count by the line counter 14 is preferentially invalidated. The invalidation target at the time of changing the cache capacity is selected based on the number of effective lines counted by the line counter 14. Accordingly, the time required for changing the cache capacity can be reduced by selecting an operation maximizing the cache data not to be invalidated.

Further, in the third embodiment, by maximizing the number of effective lines left after the change of cache capacity, hit ratio after the cache capacity is changed can be improved. When the write-through system is used, the effect can be obtained in both cases of increasing and decreasing the cache capacity, as in the case of using the write-back system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cache system that can dynamically change a cache capacity by memory areas divided into plural, comprising a line counter that counts number of effective lines for each of the memory areas in which cache data is arranged when the cache capacity is maximum, wherein
the effective line is a cache line in which effective cache data is stored,
the cache data is invalidated with changing of the cache capacity, and
at a time of changing the cache capacity, the cache data to be invalidated is selected based on the number of the effective lines counted by the line counter.

2. The cache system according to claim 1, wherein the line counter counts number of dirty lines,
the dirty line is the effective line in which the cache data that does not match data stored in a lower-order memory is stored, and
the lower-order memory is a memory in a lower hierarchy with respect to the cache system.

3. The cache system according to claim 2, wherein the line counter increments a counted number by one every time there is a write access for writing data in the cache line, and decrements the counted number by one every time there is a write back for writing back data from the cache line to the lower-order memory, and
by changing the cache capacity, the cache data to be arranged in the memory area having a less counted number is preferentially invalidated.

4. The cache system according to claim 1, wherein the line counter increments the counted number by one every time data is refilled in the cache line from the lower-order memory, and decrements the counted number by one every time the cache data stored in the cache line is released, and
by changing the cache capacity, the cache data to be arranged in the memory area having a less counted number is preferentially invalidated.

5. The cache system according to claim 1, further comprising an index converting unit that converts an index of an address, with which the cache system is cache accessed, to match the address with an address of the cache data stored in the cache system.

6. The cache system according to claim 1, further comprising:
a tag memory that stores tag information corresponding to the cache line; and
a tag comparing unit that compares tag information at an address, with which the cache system is cache accessed, with tag information read from the tag memory, wherein
the line counter includes a plurality of counters, and
the tag comparing unit outputs a bit string of the address having necessary and sufficient number of bits for indicating number of the counters to the line counter.

7. The cache system according to claim 1, wherein the line counter includes counters of a number matching a number obtained by dividing a maximum value of the cache capacity by a minimum value thereof.

8. The cache system according to claim 5, wherein the index converting unit converts the index with respect to all accesses to the cache system.

9. The cache system according to claim 5, wherein the index converting unit includes a plurality of registers, to which a value expressing an original index before a change of the cache capacity is respectively set, and outputs a value of the register selected according to a cache accessed address.

10. A cache system control method comprising:
dynamically changing a cache capacity by memory areas divided into plural; and
counting number of effective lines for each memory area in which cache data is arranged when the cache capacity is maximum, wherein
the effective line is a cache line in which effective cache data is stored,
the cache data is invalidated with changing of the cache capacity, and
at a time of changing the cache capacity, the cache data to be invalidated is selected, based on a counted number of the effective lines.

11. The cache system control method according to claim 10, wherein number of dirty lines is counted,
the dirty line is the effective line in which the cache data that does not match data stored in a lower-order memory is stored, and
the lower-order memory is a memory in a lower hierarchy with respect to the cache system.

12. The cache system control method according to claim 11, comprising:
incrementing a counted number by one every time there is a write access for writing data in the cache line, and decrementing the counted number by one every time there is a write back for writing back data from the cache line to the lower-order memory; and
changing the cache capacity, thereby preferentially invalidating the cache data to be arranged in the memory area having a less counted number.

13. The cache system control method according to claim 11, further comprising:
incrementing the counted number by one every time data is refilled in the cache line from the lower-order memory, and decrementing the counted number by one every time the cache data stored in the cache line is released; and
changing the cache capacity, thereby preferentially invalidating the cache data to be arranged in the memory area having a less counted number.

14. The cache system control method according to claim 10, further comprising matching including converting an index of an address, with which the cache system is cache accessed, and matching the address with an address of the cache data stored in the cache system.

15. The cache system control method according to claim 10, further comprising:
storing tag information corresponding to the cache line;
comparing tag information at an address, with which the cache system is cache accessed, with the tag information read from the tag memory;
outputting a bit string included in the address to a line counter that counts the number of the effective lines by using a plurality of counters; and setting number of bits of the bit string to necessary and sufficient number of bits for indicating number of the counters.

16. The cache system control method according to claim 10, further comprising counting the number of the effective lines by using the counters of a number matching a number obtained by dividing a maximum value of the cache capacity by a minimum value thereof.

17. The cache system control method according to claim 14, further comprising converting the index with respect to all accesses to the cache system.

18. The cache system control method according to claim 10, further comprising setting a value expressing an original index before a change of the cache capacity, respectively, to a plurality of registers, and outputting a value of the register selected according to a cache accessed address.

19. An information processing apparatus comprising:
a cache system that can dynamically change a cache capacity by memory areas divided into plural; and
a master that accesses the cache system, wherein
the cache system includes a line counter that counts number of effective lines for each memory area in which cache data is arranged when the cache capacity is maximum,
the effective line is a cache line in which effective cache data is stored,
the cache data is invalidated with changing of the cache capacity, and
at a time of changing the cache capacity, the cache data to be invalidated is selected based on the number of the effective lines counted by the line counter.

20. The information processing apparatus according to claim 19, wherein the master reads a counted number of the line counter and issues an invalidation request to the cache line of the cache data to be invalidated.

* * * * *